Oct. 10, 1944. G. L. LAWLESS 2,359,923
APPARATUS FOR CONDITIONING DRILLING MUDS
Filed Nov. 22, 1939 3 Sheets-Sheet 1

INVENTOR
GRANVILLE L. LAWLESS,
BY
ATTORNEY

Oct. 10, 1944.   G. L. LAWLESS   2,359,923
APPARATUS FOR CONDITIONING DRILLING MUDS
Filed Nov. 22, 1939   3 Sheets-Sheet 2

INVENTOR
GRANVILLE L. LAWLESS,
BY
ATTORNEY

Oct. 10, 1944.    G. L. LAWLESS    2,359,923
APPARATUS FOR CONDITIONING DRILLING MUDS
Filed Nov. 22, 1939    3 Sheets-Sheet 3

INVENTOR
GRANVILLE L. LAWLESS,
BY
ATTORNEY

Patented Oct. 10, 1944

2,359,923

UNITED STATES PATENT OFFICE 2,359,923

APPARATUS FOR CONDITIONING DRILLING MUDS

Granville L. Lawless, Los Angeles, Calif.

Application November 22, 1939, Serial No. 305,651

15 Claims. (Cl. 34—102)

This invention relates to apparatus for conditioning muds, and particularly muds of the type employed in the rotary drilling of oil and gas wells.

It is usual practice to circulate drilling muds through a string of drill pipe to the bottom of the hole in order to remove the cuttings therefrom and convey them around the drilling string to the surface of the bore. This mud not only cools and lubricates the drilling bit, but it also serves to build up or form a mud cake on the walls of the bore to prevent it from sluffing into the hole and also to form as much as is possible an impermeable sheath which will decrease the amount of fluid lost to the formation and which in conjunction with the hydraulic head of fluid in the hole will counteract the formation pressures encountered during the drilling and other operation.

The accomplishment of the aforementioned desirable results in the most efficient and safest manner can be attained through maintaining proper characteristics in the drilling mud, among which are its viscosity, specific gravity, and chemical constituency. However, the maintenance of these characteristics is often difficult due to the loss of water and other liquids from the mud mixture caused by the heating effect of the formation, and also due to the tendency for the suspended particles in the mud to separate out and produce a change in the specific gravity of the mud from the desirable value that is best suited for the particular conditions of operation.

Accordingly, it is an object of the present invention to prevent material variation in the viscosity, specific gravity or chemical constituency of drilling muds useful in the rotary drilling of bore holes.

A further object of the invention is the provision of an improved apparatus for agitating drilling muds to preserve their uniform constituency and physical properties.

Another object of the invention resides in the employment of an improved apparatus for aerating drilling muds to obtain a dissipation of entrapped gases, the resultant cooling of the mud serving to prevent its dehydration and loss of other desirable liquids.

Another object of the invention is to maintain uniformity of the drilling mud contained in a reservoir or source of supply.

A still further object of the invention is to provide an apparatus in which the agitation and cooling effect on drilling mud can be varied, if desired, to suit operating conditions encountered in the rotary drilling of bore holes.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings.

Figure 1:
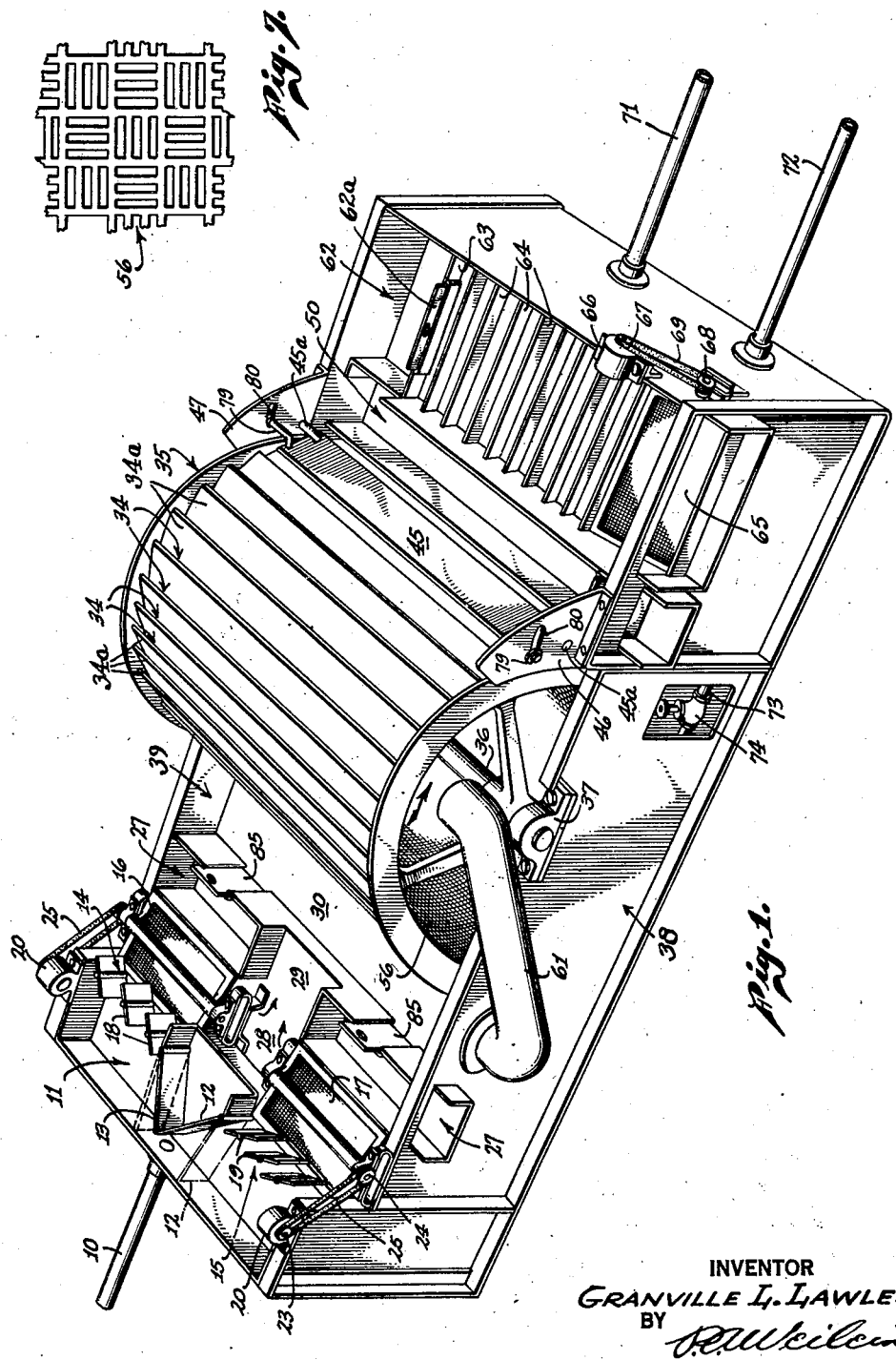
Figure 1 is a perspective view of a mud conditioning and reclamation apparatus embodying the present invention.
Figure 2:
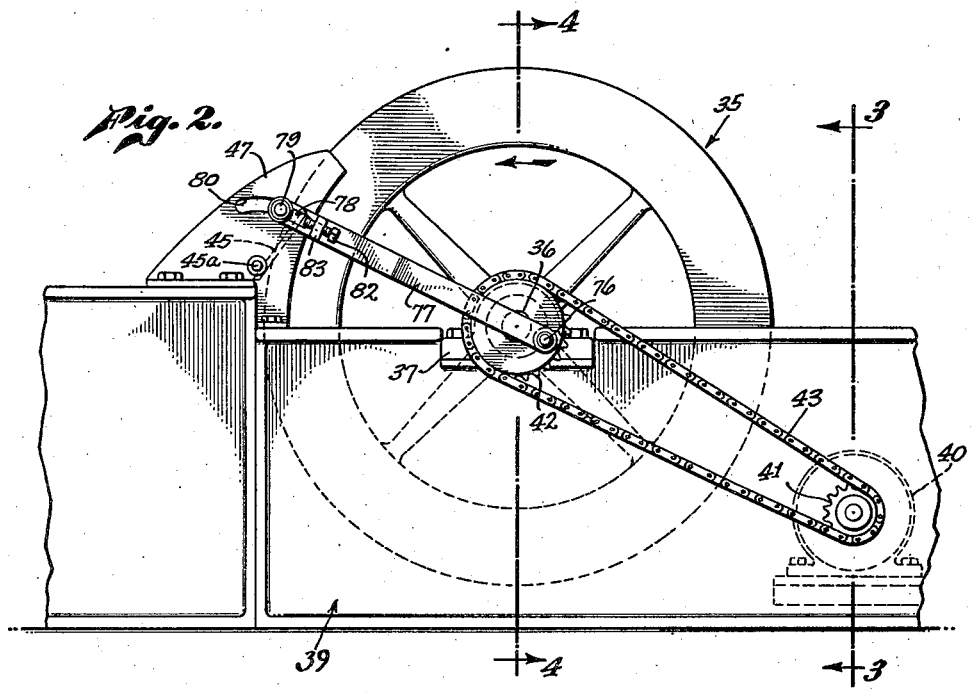
Figure 2 is a side elevation of part of the apparatus disclosed in Figure 1, as seen from the rear thereof.

The mixture of mud and cuttings to be treated enters the apparatus from the well through the intake pipe 10, from which it discharges into the upper trough 11, being deflected by the two pivoted gates 12 and 13 in opposite directions toward the entrance openings 14 and 15 to the respective shaker screens 16 and 17. The flow of the rotary drilling mud over these screens is controlled by the regulating gates 18 and 19, which also serve to distribute the mud and cuttings so that they pass onto the screens over a longer path. Each screen is agitated in a well-known manner by means of an electrical motor 20 suitably carried by the supporting structure for the apparatus, the drive to the shaker eccentric being obtained through the agency of the pulleys 23 and 24 and interconnecting belt 25. By virtue of the shaking action imparted to the screens 16 and 17, the cuttings are progressively moved downwardly over their surfaces for discharge into the trough 27 from where they are removed for suitable disposal. However, the rotary drilling mud passes through the screens into a trough 28 positioned thereunder, the streams of mud flowing toward one another and joining for passage through the trough 29 into a transverse trough 30 extending entirely across the apparatus.

Figures 4, 5:
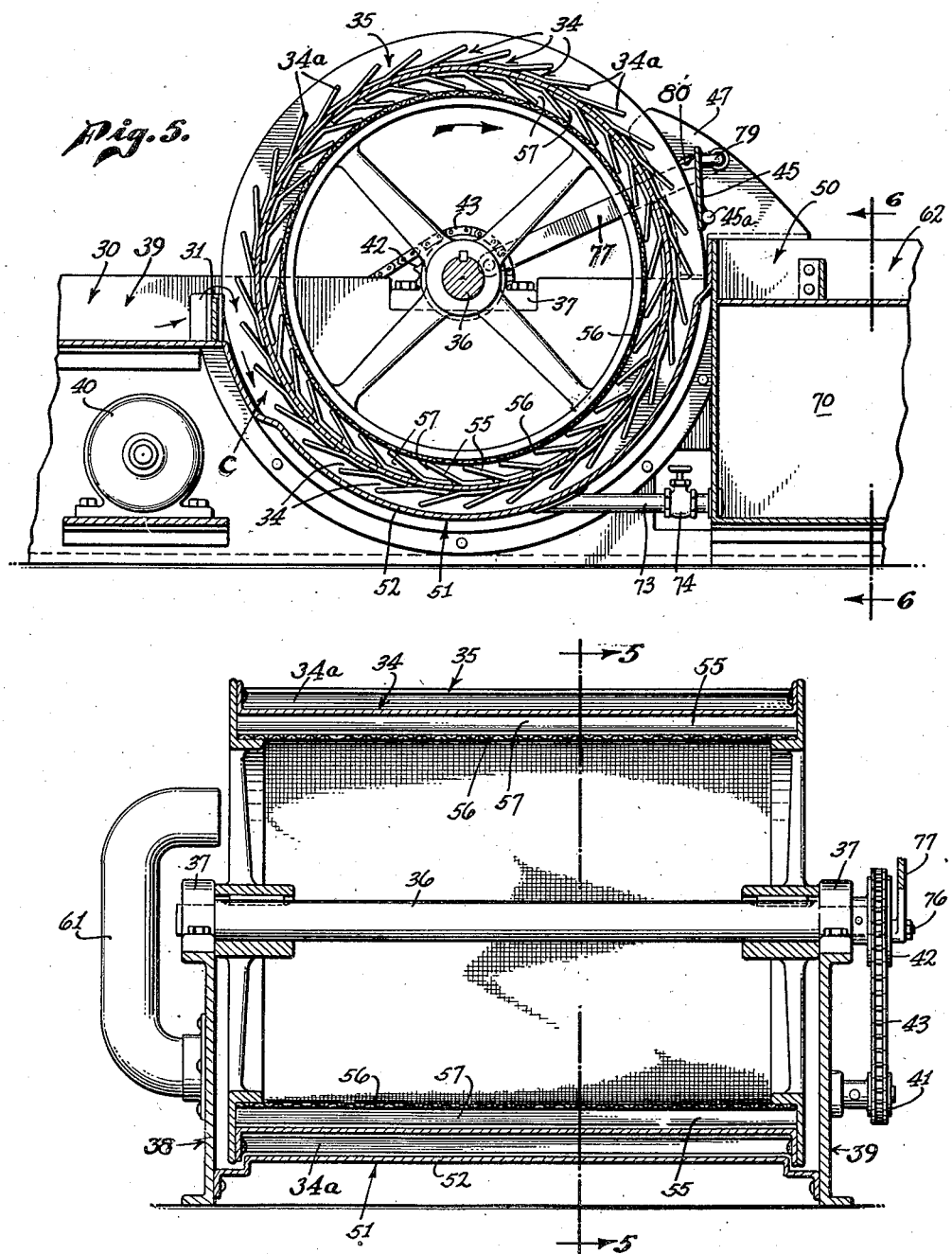
Figure 4 is a transverse section taken as indicated by line 4—4 of Figure 2.
Figure 5 is a section taken as indicated by line 5—5 of Figure 4.

For the purposes of maintaining a uniform constituency in the drilling mud so as to prevent its suspended particles and certain chemical constituents from separating, the mud is agitated by an arrangement which also serves to effect its cooling and prevent alteration in its viscosity. In the instant case, the mud flows over the forward edge 31 of the transverse trough 30 (Figures 3 and 5) and successively into a plurality of circumferentially arranged buckets 34 formed by spaced angularly disposed fins 34a on the outer periphery of a drum 35 carried by a shaft 36 rotatably mounted within bearing supports 37 suitably secured to opposite sides 38 and 39 of the apparatus frame. Rotation of the drum 35 at a suitable speed is derived from a prime mover such as an electric motor 40, carrying a driving sprocket 41, whose motion is transmitted to a driven sprocket 42, fixed to the drum shaft 36, through the intermediary of a chain 43 passing over both sprockets.

The mud flowing from the trough 30 into the peripheral buckets 34 is first carried upwardly to an uppermost position and then downwardly, spreading out as a thin film over the rear face of the preceding fin to expose a maximum surface to the cooling action of the surrounding atmosphere.

It is desired to recirculate part of this drilling mud through the agitating and cooling unit, which objective can be achieved by pivotally mounting a baffle plate 45, as at 45a, to brackets 46 and 47 on the opposite sides of the apparatus structure, and oscillating this plate at a predetermined frequency to position its upper edge in close proximity to the fins 34a, allowing the drilling mud to flow from the rear face of the fins over the baffle plate 45 into a transverse receiving trough 50. When the baffle 45 is moved away from the fins (Figure 5), it acts to direct the drilling mud into a substantially semi-cylindrical chamber 51 defined by a curved plate 52 extending between and secured to the sides of the apparatus frame. This plate 52 is so shaped as to conform closely to the peripheral outline of the outer drum fins 34a, to cause these fins to move drilling mud in the chamber 51 ahead of them and within the buckets 34 for secondary passage above the axis of the drum for the purpose of exposing it to the cooling effect of the air as a relatively thin film. Thus, it will be seen that in the lower portion of its travel during each revolution, a fin or bucket will agitate the drilling mud contained within the semi-circular chamber 51, while in its upper position the drilling mud is primarily cooled.

The mud is maintained at the desired level within the semi-circular chamber 51, spaces being provided between the sides 38 and 39 of the apparatus frame and the ends of the drum 35 to permit a certain quantity of drilling mud to pass from the trough 30 directly into the semi-circular chamber without first being required to flow downwardly past the outer fins 34a on the drum. Some of the mud can also flow from the trough 30 into the chamber 51 through a channel C (Figure 5) communicating with the spaces between the ends of the drum and the frame sides. Said channel is shown as being formed by increasing the space between an upper portion of the semi-circular chamber and the outer edges of the fins 34a. If desired, conduits could be employed for directing a portion of the mud from the trough 30 directly into the revoluble drum.

For the purpose of increasing the agitating and cooling capacity of the apparatus, the interior surface of the drum is also provided with a plurality of circumferentially spaced fins 55 inclined in a forward direction similarly to the outer set of fins 34a. A cylindrical screen 56 is provided within the drum in close proximity to the edges of the inner set of fins 55. Drilling mud from the semi-cylindrical chamber 51 or that which passes through the conduits from the forward trough 30, must pass through the screen openings before it can enter the buckets 57 defined by the inner set of fins 55. The rotation of the drum causes the screen 56 to function as an agitating unit as the mud passes through its openings for delivery into the inner set of buckets 57 which also act upon the mud to agitate and convey it to the upper portion of the apparatus, thereby assisting in the maintenance of the uniform constituency of the drilling mud by preventing separation from occurring between its various substances.

As a further aid in cooling the mud, a motor driven blower 60 can be employed to direct a blast of air into the interior of and through the drum 35. This blower is preferably enclosed within the apparatus framework, delivering its forced draft through the conduit 61 having its outlet opening adjacent one end of the drum. The air blast acts upon the drilling mud flowing downwardly from the inner set of buckets 57 through the screen openings, which action results in a material cooling of the mud dropping through the upper screen portions back into the semi-cylindrical chamber 51.

Figures 3, 6:
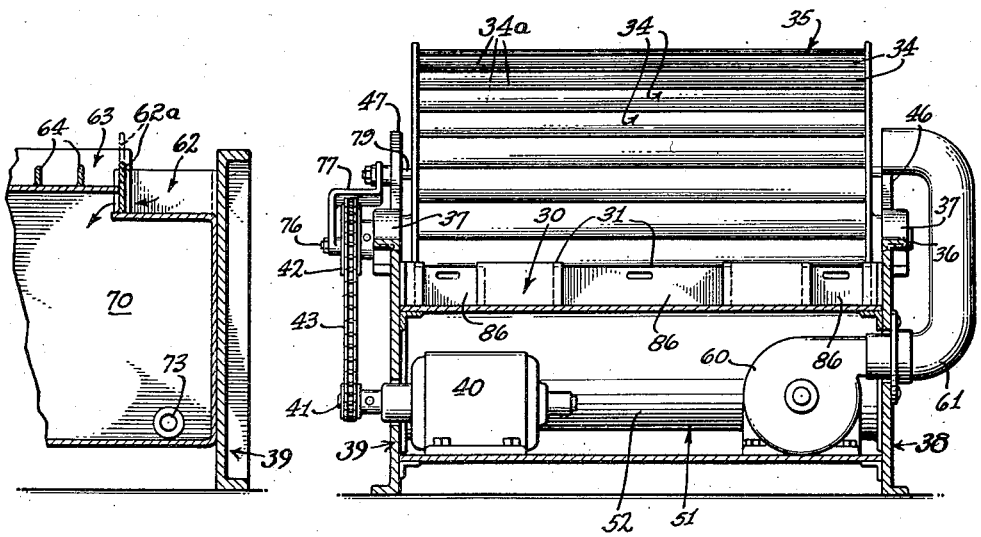
Figure 3 is a transverse section taken as indicated by line 3—3 of Figure 2.
Figure 6 is a fragmentary section taken as indicated by line 6—6 of Figure 5; and, Figure 7 is a plan view of a fragment of a drum screen embodied in the invention.

As aforementioned, only part of the mud is recirculated directly back into the semi-cylindrical chamber 51, the other part passing over the outer surface of the baffle 45 into the rearward mud conducting trough 50, from which it flows into a trough 62 and through a trough 63, over a plurality of riffles 64 for subsequent passage over another shaker screen 65, suitably vibrated by an electric motor 66, pulleys 67 and 68, and interconnecting belt 69. The drilling mud flows through this screen into a reservoir or receiver 70 which constitutes the main source of supply from which the drilling mud is drawn through the intake pipes 71 and 72 by mud pumps (not shown). The last mud shaker screen 65 is only provided as a precautionary measure to ensure that all cuttings and other undesired foreign matter has been removed from the mud, such foreign matter being vibrated downwardly over the screen for removal from the apparatus at the lower end of the screen. If desired, the mud can be made to flow directly into the reservoir 70 from the trough 62 through an opening communicating therebetween controlled by the slideable gate 62a (Figures 1 and 6).

If a large quantity of drilling mud were contained in the reservoir 70, part of its volume would probably fail to be drawn from the reservoir by the mud pumps, and due to lack of agitation its suspended particles and certain chemical substances would tend to separate, resulting in the withdrawal by the pumps of a drilling mud which would not possess the desired characteristics attained through the utilization of a uniform mixture of the substances which have been placed in the mud for the purpose of obtaining a prescribed specific gravity, viscosity, lubrication, and wall building characteristics on the sides of the formation. To prevent such separation, the entire mass of drilling mud within the reservoir 70 is kept in motion by permitting a certain rate of flow to occur between the reservoir and the semi-cylindrical chamber 51 through the pipes 73 in which are connected valves 74 for controlling the rate of flow between the reservoir and the chamber. This rate of flow should be sufficient so that this flow plus that over the baffle 31 will compensate for the quantity of drilling mud passing over the baffle plate 45 into the rear trough 50 in order to maintain a substantially constant fluid level within the curved chamber 51.

The amount of drilling mud passing over the plate 45 is governed by its rate of oscillation, and this oscillation is produced by an eccentric device consisting of a crank pin 76 secured to the drum sprocket 42 with one end of a connecting rod or pitman 77 pivoted on the crank pin, and its other end being slotted at 78 to receive an arm 79 secured to the baffle plate 45 and extending through a slot 80 in the plate 47. The slot 78 provides a lost motion connection between the pitman and the baffle plate, allowing the plate to remain in its inward position toward the drum fins 34a for a period of time. The amount of movement of the arm 79 in the pitman slot 78 is determined by an adjusting screw 82 threaded through a boss 83 on the pitman and engageable with said arm, so that the time of removal of the plate away from the fins 34a, and the period during which it remains in such position can be varied through the adjustment of the screw 82.

It will be noted that the trough 27 for the cuttings and other foreign matter is provided with slideable gates 85 controlling communicating openings with the forward mud trough 30. These gates are normally maintained in closed position, but may be elevated when the device is not operating to permit cleaning of the forward trough. Similarly, that side of the forward trough adjacent the drum is also provided with one or more slideable gates 86, which can be elevated to allow any chemicals or other matter, which may have settled to the bottom of the trough, to be removed from the trough into the semi-cylindrical chamber 51 or into the drum troughs 34 and subsequently into the semi-cylindrical chamber.

The ends of the pivoted gates 12 and 13 at the entrance of the mud conditioning apparatus normally abut to divert the stream of mud laden with foreign matter toward the two shaker screens. However, there are times when there is no need for passing the mud over these screens as, for instance, when the drill pipe is being withdrawn from or lowered into the hole. In such case, the gates 12 and 13 can be swung outwardly to the dotted line position, Figure 1, against the end wall of the apparatus frame, whereby to by-pass the mud through the trough 29 into the forward trough 30.

It will, therefore, be seen that by my improved method and apparatus the mud is not only freed from cuttings and other undesirable foreign substances, but is cooled and maintained in a continual state of motion and agitation to prevent alterations in both its physical and chemical characteristics. Danger, incident to the use of drilling mud lacking its prescribed characteristics, is thereby avoided.

I claim:

1. An apparatus for treating drilling muds comprising a plurality of means for separating said mud into individual quantities, means for moving said separating means to a position elevated above the point of separation, and for subsequently lowering said separating means to discharge each quantity of mud onto leading separating means over which it flows in the form of a relatively thin layer.

2. An apparatus for treating drilling muds comprising a series of containing means for separating said mud into individual quantities, means for subsequently moving said containing means to a position elevated above the point of separation and subsequently correspondingly lowering said means to effect a discharge of each quantity of drilling mud from its containing means in sheet form over another containing means preceding it as regards the direction of movement of said series.

3. An apparatus for treating drilling muds comprising a plurality of buckets connected together for unitary movement, means for moving said buckets into position to receive separate quantities of drilling muds, said moving means subsequently elevating said buckets to a position in which each bucket will discharge its contents onto the surface of a preceding bucket over which it will spread in a relatively thin sheet.

4. An apparatus for treating drilling muds comprising a rotatable drum having a plurality of circumferentially spaced fins secured thereto and inclined away from the surface of the drum in the direction of its rotation to form a plurality of buckets extending substantially along the entire length of the drum, means enabling said buckets to receive individual quantities of drilling muds during the rotation of the drum, each of said buckets being raised in sequence to a maximum elevation after reception of the drilling mud, whereby continued rotation of said drum will effect a discharge of the mud from said bucket onto the rearward surface of a preceding fin over which it will spread in a relatively thin layer.

5. An apparatus for treating drilling muds comprising a rotatable drum having a plurality of circumferentially spaced fins secured thereto and inclined away from the surface of the drum in the direction of its rotation to form a plurality of buckets, a container for drilling muds in which the lower portion of said drum is received, said buckets obtaining individual quantities of drilling muds from said container during rotation of the drum, after which said buckets are raised in sequence to a maximum elevation, whereby continued rotation of said drum will effect a discharge of the mud from said bucket onto the rearward surface of a preceding fin over which it will spread in a relatively thin layer, baffle means onto which said layers of mud will pass for diversion from said chamber, and means for intermittently moving said baffle means to permit said layers of drilling mud to return to said chamber.

6. An apparatus for treating drilling muds comprising a rotatable drum having a plurality of circumferentially spaced fins secured thereto and inclined away from the surface of the drum in the direction of its rotation to form a plurality of buckets, a container for drilling muds in which the lower portion of said drum is received, said buckets obtaining individual quantities of drilling muds from said container during rotation of the drum, after which said buckets are raised in sequence to a maximum elevation, whereby continued rotation of said drum will effect a discharge of the mud from said bucket onto the rearward surface of a preceding fin over which it will spread in a relatively thin layer, baffle means onto which said layers of mud will pass for diversion from said chamber, a reservoir for receiving the muds diverted by said baffle means, and means for conducting drilling mud between said reservoir and container.

7. An apparatus for treating drilling muds comprising a rotatable drum having a plurality of circumferentially spaced fins secured thereto and inclined away from the surface of the drum in the direction of its rotation to form a plurality of buckets, a container for drilling muds in which the lower portion of said drum is received, said buckets obtaining individual quantities of drilling muds from said container during rotation of the drum, after which said buckets are raised in sequence to a maximum elevation, whereby continued rotation of said drum will effect a discharge of the mud from said bucket onto the rearward surface of a preceding fin over which it will spread in a relatively thin layer, baffle means onto which said layers of mud will pass for diversion from said chamber, a reservoir for receiving the muds diverted by said baffle means, means for conducting drilling mud between said reservoir and container, and a control valve for determining the quantity of flow through said conducting means.

8. An apparatus for treating drilling muds comprising a plurality of buckets on opposite sides of a member connected together for unitary movement, screen means for receiving material from the buckets on one side of said member, means for moving said plurality of buckets into position to receive separate quantities of drilling muds, said moving means elevating said buckets to a position where the buckets on the other side of the member are caused to discharge their contents onto the surface of preceding buckets on said other side over which it flows in a relatively thin sheet and the buckets on said one side are caused to discharge their contents onto said screen.

9. An apparatus for treating drilling muds comprising a rotatable drum having a plurality of circumferentially spaced fins secured thereto and inclined away from the surface of the drum in the direction of its rotation to form a plurality of buckets, the portions of the buckets extending between the fins being imperforate, a screen within said drum, a container for drilling muds in which the lower portion of said drum is received, said buckets obtaining individual quantities of drilling muds from said container during rotation of the drum, after which said buckets are raised to a position causing discharge of their contents onto the screen through which it passes back into the container.

10. An apparatus for treating drilling muds comprising a rotatable drum having a plurality of circumferentially spaced fins on its inner and outer surfaces and inclined away from said surfaces in the direction of drum rotation to form a plurality of buckets interiorly and exteriorly of said drum, a screen within said drum, a container for drilling muds in which the lower portion of said drum is received, said inner and outer buckets obtaining individual quantities of drilling muds from said container during rotation of the drum, after which said buckets are rotated to a position where the contents of the exterior buckets is discharged onto preceding exterior buckets over which it flows in a relatively thin layer, and the contents of the interior buckets is discharged onto the screen through which it passes back into the container.

11. An apparatus for treating drilling muds comprising a rotatable drum having a plurality of circumferentially spaced fins secured to its inner surface and inclined away from said surface in the direction of the drum rotation to form a plurality of buckets, a cylindrical screen within said drum adjacent said fins, a container for drilling muds in which the lower portion of said drum is received, said buckets obtaining individual quantities of drilling muds from said container during rotation of the drum, after which said buckets are raised to a position causing discharge of their contents which flows through said screen back into the container.

12. An apparatus for treating drilling muds comprising a rotatable drum having a plurality of circumferentially spaced fins secured to its inner surface and inclined away from said surface in the direction of the drum rotation to form a plurality of buckets, a cylindrical screen within said drum adjacent said fins, a container for drilling muds in which the lower portion of said drum is received, said buckets obtaining individual quantities of drilling muds from said container during rotation of the drum, after which said buckets are raised to a position causing discharge of their contents which flows through the screen, and means for subjecting said discharged mud to a cooling medium upon passage through said screen.

13. An apparatus for treating drilling muds comprising a rotatable drum having a plurality of circumferentially spaced fins on its inner and outer surfaces and inclined away from said surfaces in the direction of drum rotation to form a plurality of buckets interiorly and exteriorly of said drum, a screen within said drum, a container for drilling muds in which the lower portion of said drum is received, said inner and outer buckets obtaining individual quantities of drilling muds from said container during rotation of the drum, after which said buckets are rotated to a position where the contents of the exterior buckets is discharged onto preceding exterior buckets over which it flows in a relatively thin layer, the contents of the interior buckets being discharged onto the screen through which it flows, and means for subjecting said contents to a cooling medium upon passage through said screen.

14. An apparatus for treating drilling muds, comprising a rotatable drum having means forming a plurality of buckets interiorly thereof, a screen within said drum, means securing said screen to said drum to rotate therewith, a container for drilling muds in which the lower portion of said drum is received, said buckets obtaining individual quantities of drilling muds from said container during rotation of the drum, after which said buckets are raised to a position causing discharge of their contents onto the screen through which it passes back into the container.

15. An apparatus for treating drilling muds, comprising a rotatable drum having imperforate portions on its surface, means cooperating with said portions to form a plurality of buckets on the drum, a container for drilling muds in which the lower portion of said drum is received, a screen, means mounting said screen within said drum and said container for movement in the container, said buckets obtaining individual quantities of drilling muds from said container during rotation of the drum, after which said buckets are raised to a position causing discharge of their contents onto the screen through which it passes back into the container.

GRANVILLE L. LAWLESS.